April 24, 1962 C. M. KLINE 3,031,064
CONVEYOR CONSTRUCTION
Filed Nov. 2, 1959
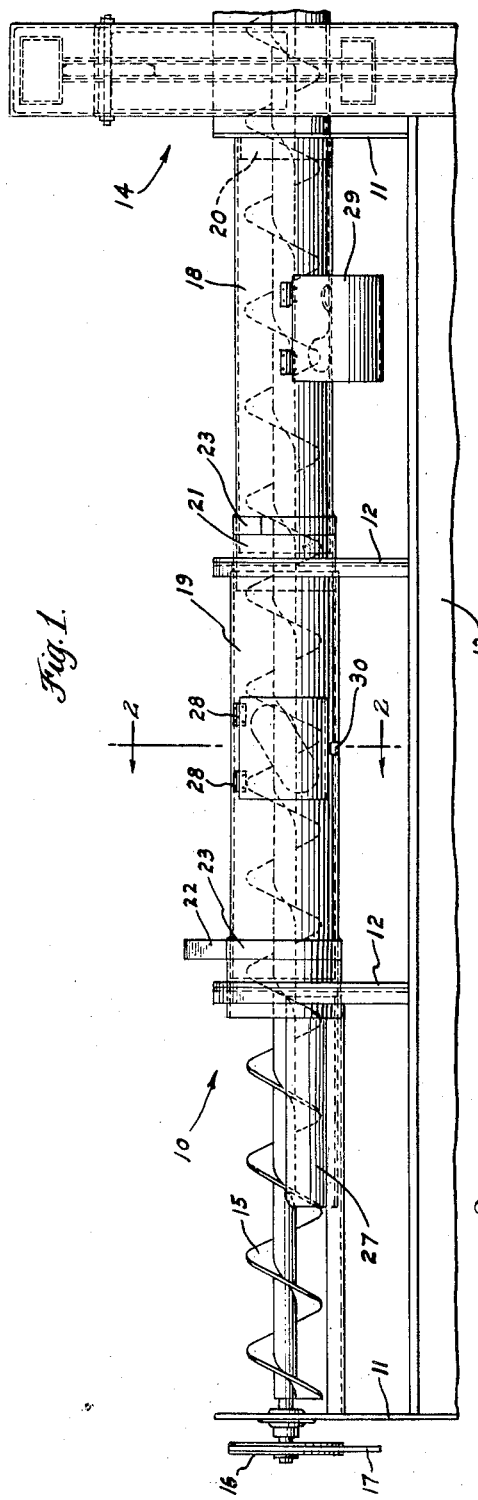
INVENTOR
CHARLES M. KLINE
ATTORNEY

United States Patent Office 3,031,064
Patented Apr. 24, 1962

3,031,064
CONVEYOR CONSTRUCTION
Charles M. Kline, Joanna, Pa., assignor to Sperry Rand Corporation, New Holland, Pa., a corporation of Delaware
Filed Nov. 2, 1959, Ser. No. 850,346
7 Claims. (Cl. 198—66)

This invention relates to mechanism for feeding and distributing granular material.

It is conventional in the field of agriculture, and in other fields dealing with granular material, to fill bins, such as storage bins or grain drying bins, by use of conveyors mounted above such bins. One type of conveyor widely employed to this end is the well known auger conveyor. A conveyor of this type may comprise an auger rotating in an enclosing tube, material being discharged through adjustable openings spaced along the length of the tube.

One use of such a conveyor, in agriculture machinery, is to fill portable grain drying bins. These bins are relatively long and narrow and may be over thirteen feet high. Because of their size, they are frequently stored and operated out-of-doors. Cat walks are provided near the top of the bins to enable an operator to check and regulate the discharge of material, from the conveyor, into the bin. Some of these augers are operated at speeds capable of feeding in excess of two thousand bushels of granular material per hour. At these high speeds, the augers tend to literally throw the material through the discharge openings, piling it against one side of the bin. It is desirable to have the material evenly distributed below the auger in the center of the bin.

One of the objects of this invention is to provide a self-adjusting deflector for discharge openings in conveyor housings whereby material discharged through said openings will be deflected downwardly and be evenly distributed beneath the conveyor, regardless of the position of the discharge opening. These deflectors are self-adjusting in response to adjustment of the position of the discharge openings.

It is desirable to close the auger and the inside of its casing from the weather to prolong the life of the mechanism and protect any material in the auger during, or after, a bin filling operation. Needless to say, it is also highly desirable, for reasons of safety, to prevent the entrance of clothing or the hand of an operator into the auger housing while the conveyor is in operation.

Other objects of the invention are to provide a self-adjusting cover that will accomplish all the above mentioned desirable results in an extremely simple and inexpensive manner.

The foregoing objects and advantages are attained by the preferred embodiment of the invention illustrated in the accompanying drawings in which:

FIG. 1 is a vertical side elevation of a conveyor illustrating an application of the self-adjusting closure member of this invention;

FIG. 2 is an enlarged cross section taken on the line 2—2 of FIG. 1;

FIGS. 3 and 4 are similar to FIG. 2, only showing different operating positions of the invention; and FIG. 5 is a side elevation of one section of the conveyor housing shown in FIG. 1, the closure member being broken away to reveal the discharge opening.

Referring now in detail to the drawings, the numeral 10 indicates, generally, a horizontal conveyor. The conveyor 10 is supported at its ends by plates 11, and at points between its ends by brackets 12. The plates 11 may be extensions of the end walls of a drying bin, the top of which is shown at 13. The bin 13 may also support brackets 12. The horizontal conveyor 10 is fed from a conventional vertical bucket elevator shown diagrammatically at 14. The elevator 14 is not a part of this invention.

The conveyor 10 comprises a horizontally disposed auger 15. The auger may be driven by a conventional pulley 16 and V-belt 17, from a source of power, not shown. The auger is rotated in the direction of the arrow in FIG. 2, to feed grain from right to left as seen in FIG. 1.

Surrounding the auger 15, for a portion of its length, is a tube. This tube is made up of a plurality of tubular sections; two sections, 18 and 19, are shown. The first section 18 is supported at its right end, FIG. 1, by a tubular projection 20 on the supporting plate 11. The other end of section 18 is supported inside a tubular portion 21 of bracket 12. It may be seen in FIG. 1 that section 19 is mounted on two brackets 12 in the same manner in which section 18 is mounted on a bracket 12 and support plate 11.

The sections 18 and 19 of the housing are coaxially mounted relative to each other and the auger. Each section is rotatable about its longitudinal axis independently of the other section and the auger. Rotation of the housing sections is facilitated by the provision of a handle 22 at one end of each section. These handles 22 are welded to rings 23, as shown at 24 in FIGS. 3 and 4. The rings 23 are, in turn, welded to the housing sections as shown at 25 in FIG. 5.

Each section of the conveyor housing is provided with a lateral discharge opening 26. See FIG. 5. As material is fed from right to left in FIG. 1, the tube sections 18 and 19 may be rotated about their axis by manipulation of handles 22. This rotation of the sections serves to raise or lower the openings 26 relative to the level of material being conveyed through the tube, as illustrated in FIGS. 2, 3 and 4. In this way, the rate of discharge through each opening 26 is selectively controlled. Material not discharged from either opening 26 is conveyed to spout 27 for discharge into the extreme left end of bin 13. Consequently, the entire length of bin 13 will be filled uniformly.

Referring now to FIG. 2, the direction of rotation of auger 15 is such that material would be thrown to the left through discharge opening 26. This would result in a piling-up of material along one side of the bin. To prevent this, applicant has provided a pair of hinges 28 on the trailing side, relative to the direction of rotation of auger 15, of each aperture 26. These hinges are above the apertures 26 in the normal discharging positions of the tube sections. See FIGS. 1, 2, 3 and 5. The pivotal axis of each hinge is parallel to the axis of the tube sections and the auger. One edge of a curved plate or closure member 29 is mounted on the hinges at each aperture 26. The members 29 are arcuate in cross section and have substantially the same radius of curvature as the outside of the housing sections 18 and 19.

A latch member 30 is provided on each housing section at the leading edge of opening 26, relative to the direction of rotation of auger 15. This is the side of opening 26 opposite the hinge mounting side. The latches 30 are spring latches. If the operator pushes plate 29 against its housing section with sufficient force to overcome spring latch 30, the plate will move past the latch and be held against movement relative to the housing. In this position, plate 29 closes aperture 26.

The latches 30 are normally disengaged during operation of the conveyor. This leaves plates 29 free to pivot about hinges 28 in response to rotation of the housing sections. In the normal dispensing positions of the housing sections, the weight of plates 29 will cause them to hang from hinges 28 in position to deflect discharged material downwardly into the center of the bin while preventing direct entrance of the operator's hands or clothing into the moving auger. See FIGS. 2 and 3. The operator occupies a position on the left side of the conveyor, as shown in these figures. If a tube section 18 or 19 is rotated to locate the aperture 26 in non-dispensing position, as shown in FIG. 4, the plate 29 automatically assumes a covering position relative to the aperture, although the latch would not be engaged as shown in FIG. 4.

From the foregoing, it is readily seen that the deflecting closure members disclosed are operative, in all dispensing positions of the tubes, to improve lateral distribution of material in the bin. It is also readily seen that, in all positions of the housing, the closure members prevent foreign matter from entering the conveyor housing.

While this invention has been described in connection with a particular embodiment thereof, it will be understood that it is capable of further modification, and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. A device for conveying granular material comprising a frame, an elongate tube extending generally horizontally and mounted on said frame for rotation about its longitudinal axis, an auger rotatably mounted within said tube, means rotating said auger in a predetermined direction to convey material through said tube from one axial end thereof toward the other end, said tube having a lateral discharge aperture from which material is discharged therefrom, means operable while material is being conveyed through said tube to selectively rotate said tube either in the direction of rotation of said auger to vary the position of said discharge aperture in one direction thereby reducing material flow therethrough or in a direction opposite to the direction of rotation of said auger to vary the position of said discharge aperture in another direction thereby increasing material flow therethrough, a member disposed outside said tube and closing said aperture in one position of said tube and means mounting said member on said tube for movement relative thereto in response to rotation of the tube whereby when said tube is rotated from said one position while material is being conveyed therethrough said member moves relative to said discharge opening to deflect downwardly material discharged laterally through said opening.

2. A device as recited in claim 1, wherein said last named means comprises, a hinge mounted on said tube above said aperture with the pivotal axis of said hinge parallel to the axis of said tube and said member is a plate mounted on said hinge for pivotal movement relative to said tube.

3. A device as recited in claim 2 wherein said tube is circular in cross-section, said plate is arcuate in cross-section having substantially the same radius of curvature as said tube, and said hinge is mounted on said tube adjacent the trailing side of said aperture relative to the direction of rotation of said auger.

4. A device as recited in claim 3, wherein a manually operable latch is mounted on said tube adjacent the leading side of said aperture relative to the direction of rotation of said auger, said latch being operable to hold said plate in closing relationship relative to said aperture and against movement relative to said tube.

5. A device for conveying granular material comprising a frame, a feed auger rotatably mounted on said frame, a first elongate hollow tube mounted on said frame and encasing a first portion of said auger, a second elongate hollow tube mounted on said frame coaxially with said first tube, said second tube encasing another portion of said auger, each of said tubes being mounted for rotation about their common axis independently of the other tube, each of said tubes having a discharge opening in the side thereof, means rotating said auger in a predetermined direction to convey material through said tubes, a handle on each tube whereby said tubes may be individually rotated to vary the position of their respective discharge openings about the common axis of said tubes, a hinge mounted on each of said tubes adjacent the trailing side of the discharge opening relative to the direction of rotation of said auger, a plate mounted on each of said hinges for pivotal movement relative to said tubes, each of said plates closing its respective discharge opening in one position of its tube and pivoting about its hinge in response to rotation of its tube from said one position to thereby uncover its opening and deflect, downwardly, material discharged through said opening.

6. A device for conveying granular material comprising a frame, an elongate tube extending generally horizontally and mounted on said frame for rotation about its own axis, means for conveying granular material through said tube, a lateral discharge opening in said tube, means to rotate said tube to selectively position said discharge opening in one of a plurality of positions about the axis of said tube while material is being conveyed therethrough, a member disposed outside said tube adjacent said discharge opening, and means connecting said member to said tube above said lateral discharge opening for movement relative thereto in response to rotation of the tube while material is being conveyed therethrough, said member depending from said mounting means and closing said opening in at least one position of the tube and deflecting downwardly material discharged through said lateral opening in other positions of said tube.

7. A device as recited in claim 6 wherein said tube is circular in cross-section, said member is an arcuate plate having substantially the same radius of curvature as said tube, the means connecting said arcuate plate to said tube is a hinge attached to said tube above said discharge opening, and a latch mounted on said tube adjacent the side of said opening opposite said hinge.

References Cited in the file of this patent

UNITED STATES PATENTS

| 2,657,831 | Pierce | Nov. 3, 1953 |
| 2,867,314 | Hansen | Jan. 6, 1959 |

FOREIGN PATENTS

| 536,423 | Canada | Jan. 29, 1957 |